(12) United States Patent
Iizuka et al.

(10) Patent No.: US 11,098,669 B2
(45) Date of Patent: Aug. 24, 2021

(54) INTERNAL COMBUSTION ENGINE CONTROL DEVICE

(71) Applicant: Hitachi Automotive Systems, Ltd., Hitachinaka (JP)

(72) Inventors: Akira Iizuka, Hitachinaka (JP); Osamu Mukaihara, Hitachinaka (JP); Koichi Tsukio, Hitachinaka (JP); Takanori Umeki, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/960,751

(22) PCT Filed: Feb. 14, 2019

(86) PCT No.: PCT/JP2019/005210
§ 371 (c)(1),
(2) Date: Jul. 8, 2020

(87) PCT Pub. No.: WO2019/181291
PCT Pub. Date: Sep. 26, 2019

(65) Prior Publication Data
US 2020/0340418 A1  Oct. 29, 2020

(30) Foreign Application Priority Data
Mar. 22, 2018  (JP) .............................. JP2018-054242

(51) Int. Cl.
| F02D 41/20 | (2006.01) |
| F02D 45/00 | (2006.01) |
| F02D 41/22 | (2006.01) |

(52) U.S. Cl.
CPC ............. *F02D 41/20* (2013.01); *F02D 45/00* (2013.01); *F02D 41/221* (2013.01);
(Continued)

(58) Field of Classification Search
CPC ...... F02D 41/20; F02D 41/221; F02D 41/062; F02D 41/22; F02D 45/00;
(Continued)

(56) References Cited

U.S. PATENT DOCUMENTS

| 5,558,065 A | * | 9/1996 | Arakawa | ................. F02D 41/20 123/490 |
| 2008/0127918 A1 | * | 6/2008 | Wineland | ................ F02D 41/20 123/90.11 |

(Continued)

FOREIGN PATENT DOCUMENTS

| JP | 10-9027 A | 1/1998 |
| JP | 2003-184616 A | 7/2003 |

(Continued)

OTHER PUBLICATIONS

International Search Report (PCT/ISA/210) issued in PCT Application No. PCT/JP2019/005210 dated May 7, 2019 with English translation (five (5) pages).

(Continued)

*Primary Examiner* — George C Jin
(74) *Attorney, Agent, or Firm* — Crowell & Moring LLP

(57) ABSTRACT

An internal combustion engine control device that can ensure diagnosis of whether a fuel injection cut function normally works and that further permits startup of an internal combustion engine in a case in which the fuel injection cut function normally works is provided. To attain the internal combustion engine control system, the startup of the internal combustion engine is prohibited when carrying of a diagnostic monitoring current based on a diagnostic drive signal related to each of fuel injection valves to each of fuel injection valves in a case of transmitting a drive prohibition signal related to each of fuel injection valves to a fuel injection valve drive circuit before the startup of the internal combustion engine and transmitting the diagnostic (Continued)

drive signal related to each of fuel injection valves to the fuel injection valve drive circuit. By transmitting the diagnostic drive signal related to each of the fuel injection valves to the fuel injection valve drive circuit and monitoring whether the diagnostic monitoring current based on the diagnostic drive signal is carried to each of fuel injection valves, it is possible to ensure diagnosis of whether the fuel injection cut function normally works.

13 Claims, 10 Drawing Sheets

(52) U.S. Cl.
 CPC ............... *F02D 2041/2003* (2013.01); *F02D 2041/2027* (2013.01); *F02D 2041/2058* (2013.01); *F02D 2041/224* (2013.01)

(58) Field of Classification Search
 CPC ..... F02D 2041/2003; F02D 2041/2027; F02D 2041/2058; F02D 2041/224; F02D 2041/202; F02D 2041/2086; F02N 11/101
 See application file for complete search history.

(56) References Cited

U.S. PATENT DOCUMENTS

| | | | | |
|---|---|---|---|---|
| 2008/0127940 A1* | 6/2008 | Stephan | ................. | F02M 53/06 123/445 |
| 2009/0121724 A1* | 5/2009 | Perryman | ........... | F02D 41/2096 324/522 |
| 2009/0138176 A1 | 5/2009 | Murakami | | |
| 2014/0358408 A1* | 12/2014 | Pursifull | ............. | F02D 19/0628 701/113 |
| 2016/0108847 A1* | 4/2016 | Nakano | ................... | F02D 41/40 123/490 |
| 2016/0160783 A1* | 6/2016 | Fujita | .................... | F02D 41/221 701/103 |
| 2020/0056570 A1* | 2/2020 | Sugiyama | ............... | F02D 41/22 |

FOREIGN PATENT DOCUMENTS

| | | |
|---|---|---|
| JP | 2009-127574 A | 6/2009 |
| JP | 2015-10555 A | 1/2015 |
| JP | 2017-44087 A | 3/2017 |
| WO | WO 2015/125551 A2 | 8/2015 |

OTHER PUBLICATIONS

Japanese-language Written Opinion (PCT/ISA/237) issued in PCT Application No. PCT/JP2019/005210 dated May 7, 2019 (four (4) pages).

Japanese-language Office Action issued in Japanese Application No. 2020-507431 dated Mar. 23, 2021 with English translation (eight (8) pages).

\* cited by examiner

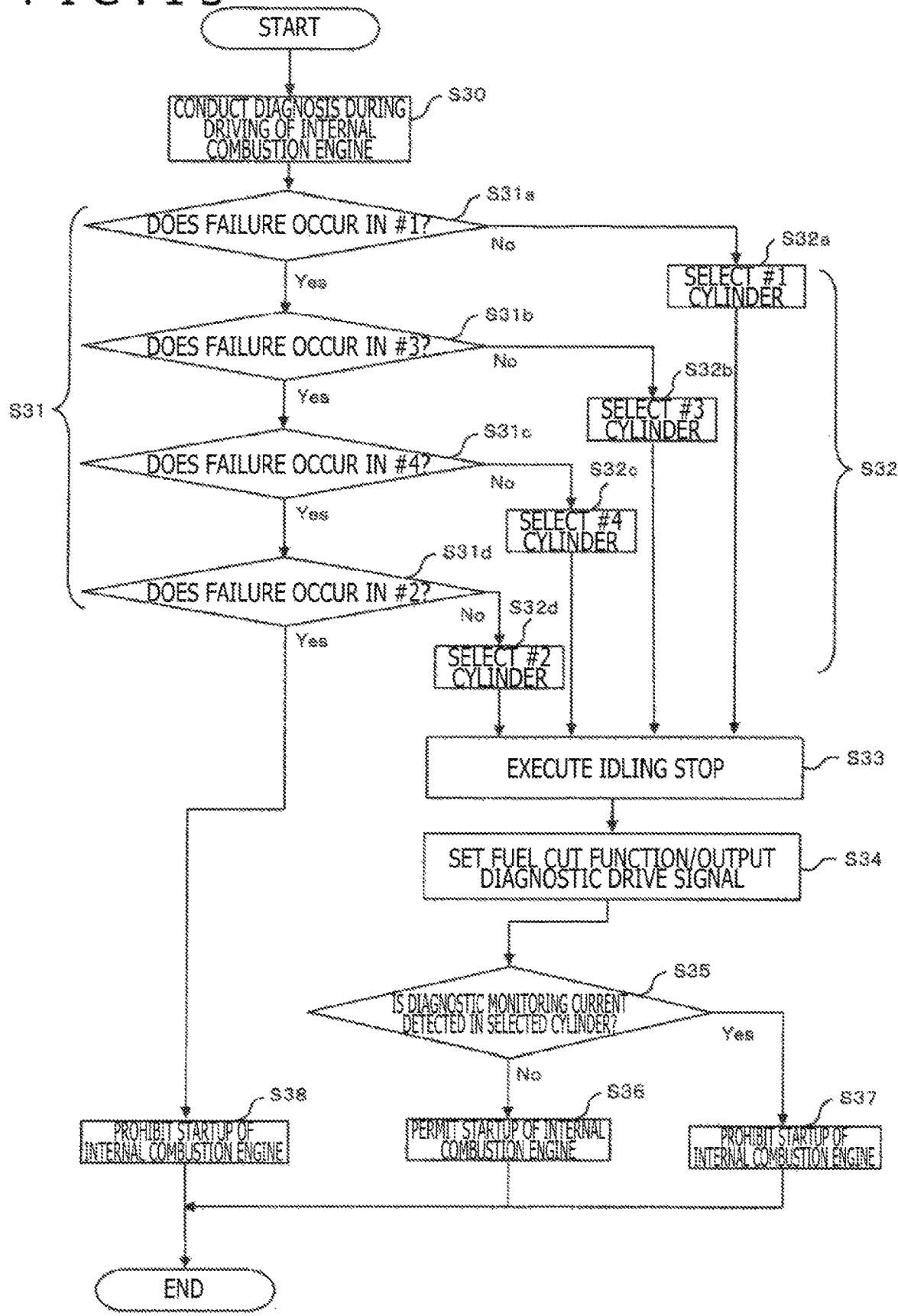

INTERNAL COMBUSTION ENGINE CONTROL DEVICE

TECHNICAL FIELD

The present invention relates to an internal combustion engine control device for controlling a fuel injection valve that supplies a fuel to each combustion chamber of an internal combustion engine, and particularly relates to an internal combustion engine control device having a function that confirms normality of a fuel injection cut function.

BACKGROUND ART

At a time of detecting an abnormality/a failure in a mechanical component or a control component that affects an engine torque, an internal combustion engine control device notifies an operator of the abnormality in an internal combustion engine and executes fail-safe functions including a fuel injection cut function, an ignition control cut function, and a throttle fixed opening setting function. However, in a case in which the internal combustion engine runs into a state of requiring the fail-safe functions without confirmation of whether the fail-safe functions normally work, if the fail-safe functions do not operate, the internal combustion engine possibly falls into a state of generation of an abnormal engine torque. It is, therefore, necessary to confirm whether the fail-safe functions normally work.

For example, JP-2009-127574-A (Patent Document 1) discloses an internal combustion engine control device that executes abnormal diagnosis of a fuel injection cut function to confirm whether the fuel injection cut function normally works during fail-safe, by setting a diagnosis period for diagnosing the fuel injection cut function within a period within which an internal combustion engine stops running, outputting a fuel injection cut signal to a fuel injection valve drive circuit in the fuel injection cut function diagnosis period, and monitoring a signal state of an operating state monitoring port (Disablement port) of the fuel injection valve drive circuit at that time.

PRIOR ART DOCUMENT

Patent Document

Patent Document 1: JP-2009-127574-A

SUMMARY OF THE INVENTION

Problem to be Solved by the Invention

The internal combustion engine control device disclosed in Patent Document 1 monitors the signal state of the operating state monitoring port in the fuel injection valve drive circuit. However, the internal combustion engine control device disclosed in Patent Document 1 is incapable of discriminating stopping to drive each fuel injection valve by the normal fuel injection cut function from stopping the fuel injection valve due to abnormalities in the fuel injection valve drive circuit and in a fuel injection control device that controls the fuel injection valve drive circuit, in determination. Owing to this, the internal combustion engine control device disclosed in Patent Document 1 has a problem that the fuel injection control device deems the fuel injection cut function not to normally work and prohibits the startup of the internal combustion engine itself although the fuel injection cut function actually works normally. It is noted that in a case of stopping the fuel injection valve by an abnormality other than the abnormality in the fuel injection cut function, another diagnosis function is used in diagnosis.

An object of the present invention is to provide an internal combustion engine control device that can ensure diagnosis of whether a fuel injection cut function normally works and that further prohibits startup of an internal combustion engine in a case of determining that the fuel injection cut function does not normally work.

Means for Solving the Problem

The present invention is characterized by prohibiting startup of an internal combustion engine when detecting carrying of a drive current based on a drive signal related to each of fuel injection valves to the fuel injection valve drive circuit in a case of transmitting a drive prohibition signal related to each of fuel injection valves to a fuel injection valve drive circuit before the startup of the internal combustion engine and transmitting the drive signal related to each of fuel injection valves to the fuel injection valve drive circuit.

Advantages of the Invention

According to the present invention, by transmitting the drive signal related to each of the fuel injection valves to the fuel injection valve drive circuit in a state of transmitting the drive prohibition signal related to each of fuel injection valves to the fuel injection valve drive circuit to actuate the fuel injection cut function, and by monitoring whether the current based on the drive signal is carried to each of fuel injection valves, it is possible to ensure diagnosis of whether the fuel injection cut function normally works.

BRIEF DESCRIPTION OF THE DRAWINGS

FIG. 13 is a control flowchart for determining normality of the fuel injection cut function according to a third embodiment of the present invention.

MODES FOR CARRYING OUT THE INVENTION

Embodiments of the present invention will be described hereinafter in detail with reference to the drawings. It is to be noted that the present invention is not limited to the embodiments described hereinafter but encompasses various modifications and application examples within a technical concept of the present invention.

First Embodiment

While a first embodiment of the present invention is described in detail with reference to FIGS. 1 to 11, a configuration of an internal combustion engine control device to which the present invention is applied will be roughly described with reference to FIG. 1. While FIG. 1 illustrates that the present invention is applied to a direct-injection internal combustion engine in which each fuel injection valve is mounted to each cylinder, the present invention is also applicable to an internal combustion engine in which each fuel injection valve is mounted to an intake manifold.

Figure 1:
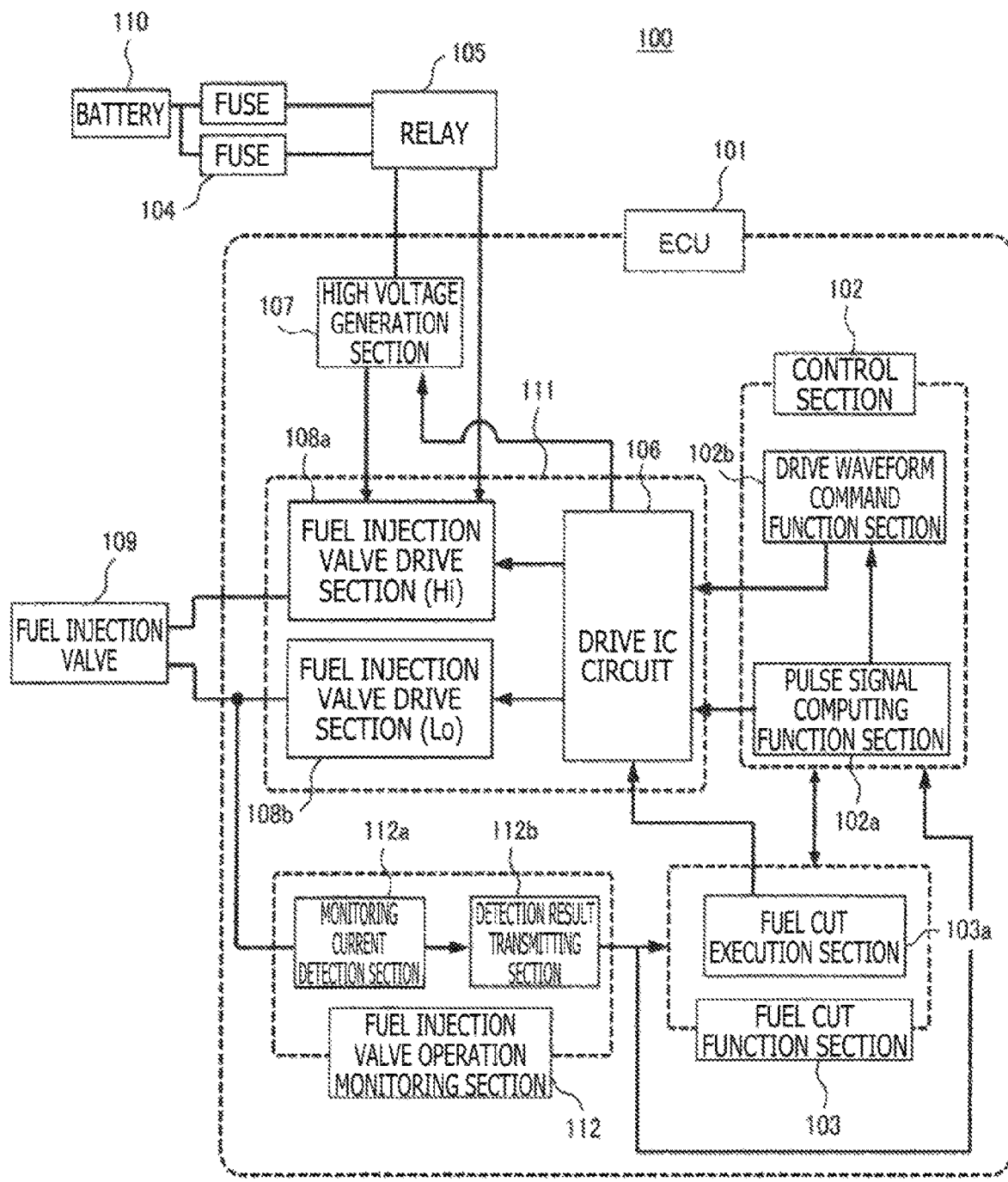
FIG. 1 is a configuration diagram depicting an overall configuration of an internal combustion engine fuel injection system to which the present invention is applied.

In FIG. 1, an internal combustion engine fuel injection system 100 is configured from a fuel injection control device (hereinafter, denoted as "ECU") 101, and the ECU 101 has a function that generates a drive control signal related to each fuel injection valve 109. An internal combustion engine is, for example, an in-line four-cylinder gasoline internal combustion engine.

The ECU 101 executes various kinds of processing on the basis of input various signals. For example, the ECU 101 controls each electromagnetic solenoid fuel injection valve 109. It is noted that the fuel injection valve 109 is a direct fuel injection type fuel injection valve that injects a fuel into each cylinder.

The ECU 101 is configured with a control section 102 that has an injection pulse width change function and a drive waveform change function, a fuel injection cut function section 103 that has a fuel injection cut function, a fuel injection valve drive circuit 111 configured from a drive IC circuit 106 and fuel injection valve drive sections 108, a high voltage generation section 107, and a fuel injection valve operation monitoring section 112. A battery voltage supplied from a battery power supply 110 is supplied to the high voltage generation section 107 and the high-side fuel injection valve drive section 108a via fuses 104 and a relay 105.

The control section 102 is configured by, for example, a microcomputer having a CPU, a memory, and an I/O port. The control section 102 configured by the microcomputer has a pulse signal computing function section 102a and a drive waveform command function section 102b. Furthermore, the control section 102 outputs a fuel cut command and a fuel cut cancellation command to the fuel injection cut function section 103 for executing fuel cut diagnosis.

The pulse signal computing function section 102a determines a fuel injection pulse width (=current-carrying time) for driving each fuel injection valve 109 on the basis of an input internal combustion engine operating parameter (for example, a sensor value detected by a sensor or the like), and outputs the fuel injection pulse width to the drive IC circuit 106. Examples of the input operating parameter include a fuel temperature, a cooling water temperature, a lubricant temperature, and a fuel pressure. Furthermore, the drive waveform command function section 102b determines a drive waveform of a current for driving each fuel injection valve 109 on the basis of the operating parameter described above, and outputs the drive waveform to the drive IC circuit 106 as a command (request).

A drive period (=current-carrying time) of each fuel injection valve 109, selection of a drive voltage (selection of either a high voltage generated by the high voltage generation section 107 or the battery voltage from the battery power supply 110), and a target value of a drive current are set to the drive IC circuit 106 in the fuel injection valve drive circuit 111 on the basis of an output from the pulse signal computing function section 102a and the command from the drive waveform command function section 102b. The drive IC circuit 106 drives the high voltage generation section 107 and the fuel injection valve drive sections 108a and 108b in accordance with this setting.

At a time of opening a valving element provided in each fuel injection valve 109, the high voltage generation section 107 steps up the battery voltage to generate the high voltage to be supplied to the fuel injection valve 109, and supplies the high voltage to the high-side fuel injection valve drive section 108a. Specifically, the high voltage generation section 107 steps up the battery voltage supplied from the battery power supply 110 so that the voltage reaches a desired target high voltage on the basis of a command from the drive IC circuit 106, and generates the high voltage higher than the battery voltage. With this configuration, two system voltages, that is, the high voltage intended to ensure a valving element opening force and the battery voltage intended to keep the valving element opened to prevent the valving element from being closed after being opened are prepared as power supplies for supplying the voltage to each fuel injection valve 109.

The high-side fuel injection valve drive section 108a is electrically connected to an upstream side of an exciting coil of each fuel injection valve 109. The high-side fuel injection valve drive section 108a controls supply of the voltage to the fuel injection valve 109 and selects the voltage to be supplied (either the high voltage generated by the high voltage generation section 107 or the battery voltage from the battery power supply 110).

Furthermore, the low-side fuel injection valve drive section 108b is electrically connected to a downstream side of the exciting coil of each fuel injection valve 109. The low-side fuel injection valve drive section 108b changes over between grounding the exciting coil of the fuel injection valve 109 and not grounding the exciting coil thereof on the basis of control of the drive IC circuit 106.

Next, configurations of the fuel injection valve drive sections 108a and 108b will be briefly described with reference to FIG. 2. The high-side fuel injection valve drive section 108a is configured with a combinational circuit of a diode 201 and a drive circuit 203 and a combinational circuit of a diode 202 and a drive circuit 204.

One end of the diode 201 is electrically connected to the high voltage generation section 107 and the other end thereof is electrically connected to the drive circuit 203. The diode 201 prevents a back flow of a current to the high voltage generation section 107. The drive circuit 203 is, for example, a transistor, a collector is electrically connected to the diode 201, a base is electrically connected to the drive IC circuit 106, and an emitter is electrically connected to one end of the exciting coil of each fuel injection valve 109. The drive circuit 203 controls the supply of the current from the high voltage generation section 107 to the fuel injection valve 109 via the diode 201 on the basis of a signal input to the base from the drive IC circuit 106.

One end of the diode 202 is electrically connected to the battery power supply 110 and the other end thereof is electrically connected to the drive circuit 204. The diode 202 prevents a back flow of a current to the battery power supply 110. The drive circuit 204 is, for example, a transistor, a collector is electrically connected to the diode 202, a base is electrically connected to the drive IC circuit 106, and an emitter is electrically connected to each fuel injection valve 109. The drive circuit 204 controls the supply of the current from the battery power supply 110 to the fuel injection valve 109 via the diode 202 on the basis of a signal input to the base from the drive IC circuit 106.

The high-side fuel injection valve drive section 108a applies the high voltage generated by the high voltage generation section 107 to each fuel injection valve 109 in a case in which a signal for turning on the drive circuit 203 is input from the drive IC circuit 106 to the high-side fuel injection valve drive section 108a on the basis of an output and a command from the control section 102, and on the other hand, applies the battery voltage from the battery power supply 110 to the fuel injection valve 109 in a case in which a signal for turning on the drive circuit 204 is input thereto from the drive IC circuit 106.

The low-side fuel injection valve drive section 108b is configured with a drive circuit 205 and a shunt resistor 206. The drive circuit 205 is, for example, a transistor, a collector is electrically connected to each fuel injection valve 109, a base is electrically connected to the drive IC circuit 106, and an emitter is electrically connected to the shunt resistor 206. The drive circuit 205 controls the supply of the current from the other end of the exciting coil of the fuel injection valve 109 to the shunt resistor 206 on the basis of a signal input to the base from the drive IC circuit 106. One end of the shunt resistor 206 is electrically connected to the drive circuit 205 and the other end thereof is grounded. The shunt resistor 206 detects a current carried across the resistor and the current is output to the fuel injection valve operation monitoring section 112 via an amplifier 207 as a diagnostic monitoring current.

The low-side fuel injection valve drive section 108b detects the diagnostic monitoring current carried across the shunt resistor 206 when a signal for turning on the drive circuit 205 is input to the low-side fuel injection valve drive section 108b from the drive IC circuit 106 on the basis of a command from the control section 102.

In the control section 102, a drive current profile is preset to a memory element of the drive waveform command function section 102b on the basis of characteristics of each fuel injection valve 109 for driving the fuel injection valve 109, and the drive current profile is stored to correspond to injection amount characteristics of the fuel injection valve 109. The drive current profile from the drive waveform command function section 102b is output to the drive IC circuit 106.

Furthermore, in the control section 102, the pulse signal computing function section 102a calculates the drive time (pulse width) of opening the fuel injection valve 109 on the basis of a running state quantity (a quantity of intake air, a revolving speed, or the like) of the internal combustion engine and the fuel injection amount characteristic of the fuel injection valve 109, generates an ON/OFF signal as a pulse signal, and outputs the pulse signal to the drive IC circuit 106. The drive IC circuit 106 turns on the pulse signal from a point in time of desired injection timing calculated by the control section 102, and applies a current to each fuel injection valve 109 in accordance with the drive current profile stored in the control section 102 in advance.

The drive current profile is configured from a plurality of target current values including a current value of a valve-opening peak current for opening each fuel injection valve 109, a current value of a first holding current for holding the fuel injection valve 109 to be opened, and a current value of a second holding current lower than the current value of the first holding current. The drive IC circuit 106 applies a drive current in response to the drive current profile to the fuel injection valve 109 from a point in time of turning on the pulse signal until a point in time of turning off the pulse signal on the basis of a preset control sequence.

The fuel injection valve operation monitoring section 112 will next be described. The fuel injection valve operation monitoring section 112 is configured with at least a monitoring current detection section 112a that detects that the diagnostic monitoring current carried to the fuel injection valve 109 reaches a predetermined value, and a detection result transmitting section 112b that transmits a detection result to the fuel injection cut function section 103. Since the diagnostic monitoring current has a current value lower than the holding current value described above, a current threshold lower than the holding current value is set in the monitoring current detection section 112a. Furthermore, the fuel injection cut function section 103 outputs the detection result to the control section 102.

It is noted that the detection result can be directly output to the control section 102 without via the fuel injection cut function section 103.

At a time of diagnosis of the fuel injection cut function, the drive current is carried to each fuel injection valve 109 by supplying a drive signal (pulse signal) to the fuel injection valve drive sections 108a and 108b on purpose. Since the drive signal is used in the diagnosis of the fuel injection cut function, the drive signal will be described as the diagnostic drive signal, hereinafter. In addition, the drive current carried to the shunt resistor 206 is also used in the diagnosis of the fuel injection cut function to correspond to the diagnostic drive signal; thus, the drive current will be described as the diagnostic monitoring current, hereinafter.

Furthermore, the fuel injection valve operation monitoring section 112 monitors the diagnostic monitoring current supplied from the shunt resistor 206, and determines that the diagnostic drive signal is output from the drive IC circuit 106 in a case of detecting the diagnostic monitoring current based on the diagnostic drive signal, and that the diagnostic drive signal is not output from the drive IC circuit 106 in a case of not detecting the diagnostic monitoring current.

Figure 2:
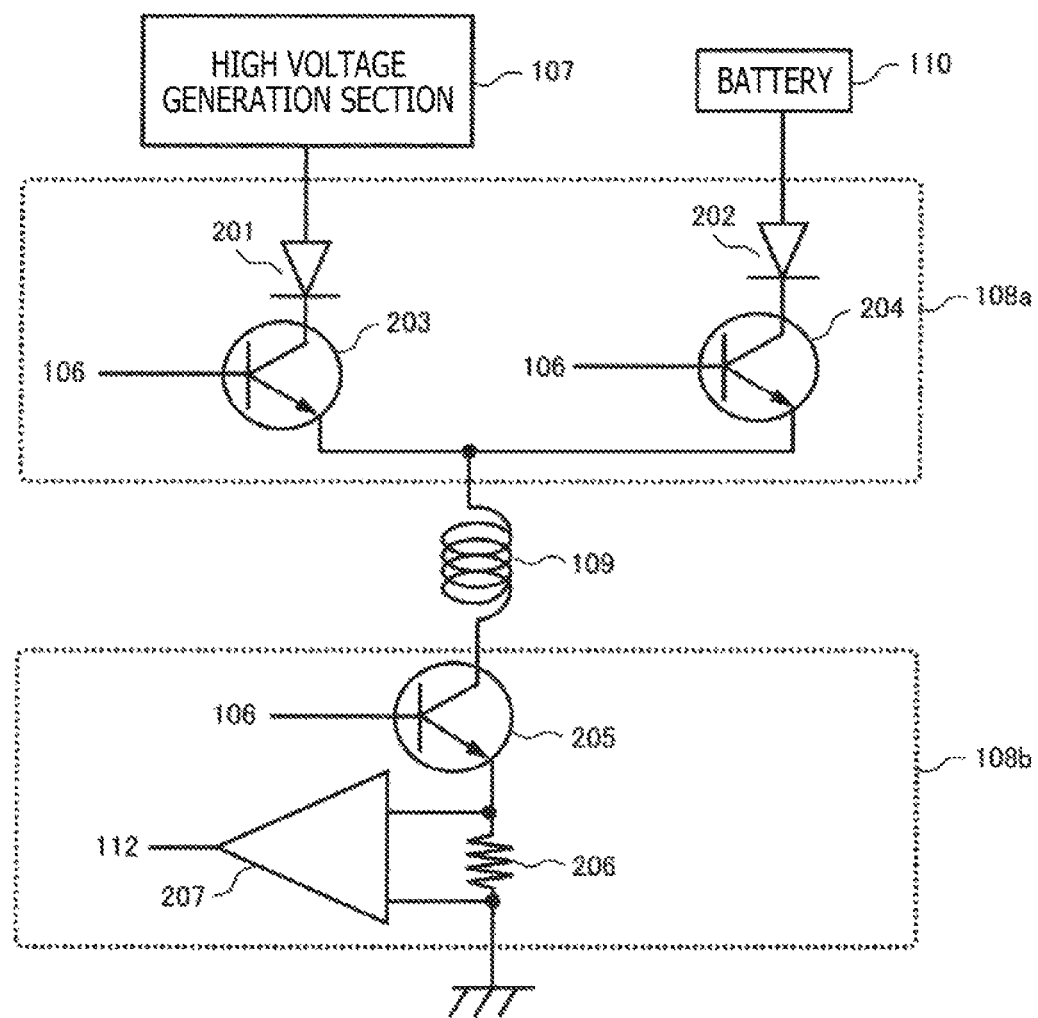
FIG. 2 is a circuit diagram depicting a configuration of a fuel injection valve drive section depicted in FIG. 1.

It is noted herein that the diagnostic drive current based on the diagnostic drive signal is supplied from the battery power supply 110 as depicted in FIG. 2, and yet, the current-carrying time of the diagnostic drive signal is set to pulse time for which each fuel injection valve 109 is not allowed to be opened. Furthermore, the diagnostic monitoring current detected by the shunt resistor 206 is set to have the value lower than the second holding current value described above. While the drive current is set as a detection target, the detection target may be a drive voltage.

Next, a specific diagnosis method for diagnosing whether the fuel injection cut function normally works according to the present embodiment will next be described with reference to FIG. 3. It is noted that timing charts in a case of executing a diagnostic flow of FIG. 3 will be also described with reference to FIGS. 5 to 8 as well as the diagnostic method.

FIGS. 5 to 8 depict timing of diagnostic drive signals (pulse signals) Tdig output from the drive IC circuit 106, a fuel injection cut setting/cancellation signal Scut output from the fuel injection cut function section 103 to the drive IC circuit 106, and a diagnostic monitoring current Idig detected by the fuel injection valve operation monitoring section 112.

In FIGS. 5 to 8, a comparison of a state in which the fuel injection cut function is set and the diagnostic drive signals are output (hereinafter, referred to as fuel injection cut setting state) with a state in which the fuel injection cut function is cancelled and the diagnostic drive signals are output (hereinafter, referred to as fuel injection cut cancellation state). While a sequential order of outputting the diagnostic drive signals is set to a sequential order of actuating cylinders, the order can be disregarded since the internal combustion engine is basically inactive. It is noted that the following control flow is a function executed by the microcomputer of the control section 102.

<<Step S10>> In Step S10, a diagnosis function (function safety diagnosis) in the fuel injection cut function is activated before startup of the internal combustion engine. Therefore, in a case in which it is determined that timing is not before the startup of the internal combustion engine, processing goes to END and arrival of next startup timing is waited for. On the other hand, if it is determined that timing is before the startup, the diagnosis of the fuel injection cut function is executed. The activation is carried out on the basis of (synchronously with) an ON signal for turning on an ignition switch, and it is specified that control steps up to Steps S16 to S19 to be described later for the diagnosis of the fuel injection cut function are completed within time before a starter motor is activated. When the diagnosis function in the fuel injection cut function is activated, the processing goes to Step S11.

<<Step S11>> In Step S11, a drive prohibition signal Scut related to each fuel injection valve 109 is transmitted to the drive IC circuit 106 in such a manner that the fuel injection cut function section 103 sets the fuel injection cut function, and the drive IC circuit 106 is set into the fuel injection cut setting state. Even with the drive signal input to the drive IC circuit 106 from the control section 102 and the fuel injection cut function section 103, a fuel is not injected if the fuel injection cut function is normal and the drive IC circuit 106 is set into the fuel injection cut setting state. Upon setting the drive IC circuit 106 into the fuel injection cut setting state, the processing goes to Step S12.

Figure 4:
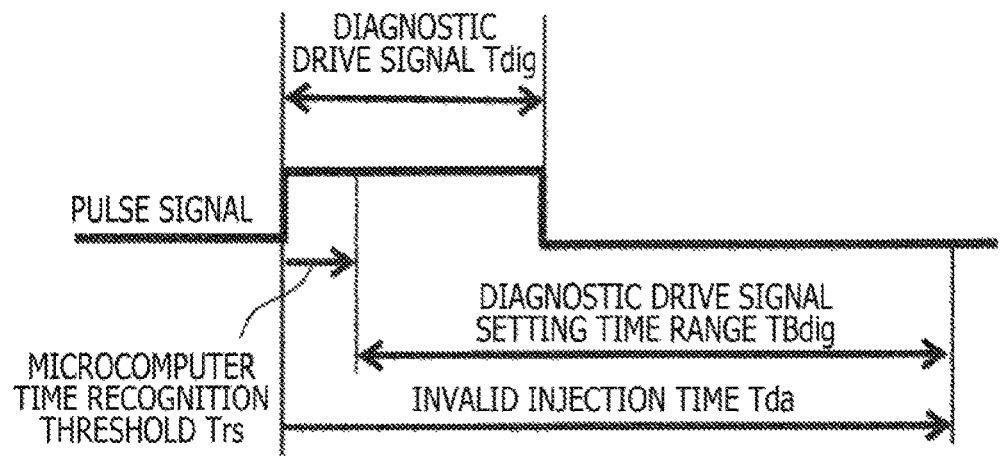
FIG. 4 is an explanatory diagram of a diagnostic drive signal applied to each fuel injection valve at a time of diagnosis.

<<Step S12>> In Step S12, the control section 102 transmits an instruction signal to the drive IC circuit 106 so that the drive IC circuit 106 outputs the diagnostic drive signal Tdig (refer to FIG. 4). The drive IC circuit 106 outputs the diagnostic drive signal Tdig to the fuel injection valve drive sections 108a and 108b in response to the instruction signal. In this case, the drive circuit 204 in the high-side fuel injection valve drive section 108a is turned on to select the battery power supply 110, and the drive circuit 205 in the low-side fuel injection valve drive section 108b is turned on.

It is noted that current-carrying time of the diagnostic drive signal Tdig is set to the current-carrying time for which each fuel injection valve 109 is not allowed to be opened. The diagnosis is carried out before the startup of the internal combustion engine, and this setting is intended to avoid a situation in which an unburned fuel stagnates in a combustion chamber when each fuel injection valve 109 is driven and in which the fuel is discharged to outside as an unburned component at a time of the startup.

FIG. 4 depicts the diagnostic drive signal Tdig, and the current-carrying time of the diagnostic drive signal Tdig is specified to fall in a diagnostic drive signal setting time range TBdig that is shorter than disabled injection time Tda and longer than a time recognition threshold Trs set by the microcomputer.

It is noted herein that the disabled injection time Tda is time for which the valving element does not run even if a predetermined drive current is applied to each fuel injection valve 109 from the battery power supply 110, and the valving element conversely runs if the drive current is applied to the fuel injection valve 109 for time equal to or longer than the disabled injection time Tda. Since the disabled injection time Tda varies depending on each fuel injection valve 109, appropriate disabled injection time Tda may be set.

In this way, in the present embodiment, the control section 102 transmits the drive signal Tdig in which the current-carrying time is set shorter than the disabled injection time for which the fuel injection valve 109 is not allowed to be opened, to the fuel injection valve drive circuit 111.

Furthermore, in a case of ordinary control, the internal combustion engine fuel injection system 100 is configured in such a manner that the high voltage generated by the high voltage generation section 107 is supplied to open each fuel injection valve 109. However, since the present embodiment is applied to the direct-injection internal combustion engine and there is no need to use the diagnostic drive signal Tdig for opening the fuel injection valve 109, the internal combustion engine fuel injection system 100 is configured in such a manner that the current for the diagnostic drive signal Tdig is supplied from the battery power supply 110. It is thereby possible to ensure avoidance of an operation of opening each fuel injection valve 109.

In this way, in the present embodiment, the control section 102 transmits a drive prohibition cancellation signal related to each fuel injection valve to the fuel injection valve drive circuit 111 before the startup of the internal combustion engine, and exercises control such that the drive current carried to the fuel injection valve 109 from the fuel injection valve drive circuit 111 is supplied from the battery power supply 110 without via the high voltage generation section 107 in the case of transmitting the drive signal Tdig related to the fuel injection valve 109 to the fuel injection valve drive circuit 111.

Moreover, the current value at a time of applying the diagnostic drive signal is limited to the current value lower than the second holding current value described above. In a case in which the second holding current value is not set and only the first holding current value is set, the current value at the time of applying the diagnostic drive signal is limited to a current value lower than the first holding current value. In a case of the internal combustion engine in which the fuel injection valves are disposed in the intake manifold, the high voltage generation section is not provided and the battery power supply is used without using the high voltage generation section; thus, a length of the diagnostic drive signal Tdig may be specified to be adapted to the battery power supply.

In this way, according to the present embodiment, the current value of the drive current supplied from the fuel injection valve drive circuit 111 to each fuel injection valve 109 on the basis of the drive signal Tdig is set to a magnitude at which the fuel injection valve 109 is not allowed to be opened.

Furthermore, the diagnostic drive signals Tdig are applied to the fuel injection valves of the cylinders in accordance with the sequential order of actuating the cylinders. In a case of, for example, a four-cylinder engine, the diagnostic drive signals Tdig are applied to the fuel injection valves in a sequential order of first cylinder→third cylinder→fourth cylinder→second cylinder. Needless to say, there is no need to adapt the order to an intake stroke and a compression stroke in a compression cycle since the internal combustion engine does not revolve at this time; thus, the diagnostic drive signals Tdig may be applied to the fuel injection valves 109 of the cylinders at predetermined time intervals. When the supply of the diagnostic drive signals is over, the processing goes to Step S13.

<<Step S13>> In Step S13, it is determined whether the diagnostic drive current has been supplied to each fuel injection valve 109 on the basis of the diagnostic drive signal set/output in Step S12. In this case, the drive circuit 204 in the high-side fuel injection valve drive section 108*a* is turned on and the drive circuit 205 in the low-side fuel injection valve drive section 108*b* is turned on in FIG. 2. Therefore, the diagnostic monitoring current Idig is carried across the shunt resistor 206 in a case in which the fuel injection cut function does not normally cut fuel injection or a case in which the fuel injection cut function is cancelled.

It is noted that determinations are executed to all fuel injection valves and that the determinations are according to the sequential order of actuating the cylinders as illustrated in Steps S13*a* to S13*d*. For example, when the diagnostic monitoring current Idig is observed in the fuel injection valve 109 of the first cylinder in Step S13*a*, the processing goes to Step S18. On the other hand, when the diagnostic monitoring current Idig is not observed in the fuel injection valve 109 of the first cylinder, it is determined whether the diagnostic monitoring current Idig is observed in the fuel injection valve 109 of the third cylinder in Step S13*b*. When the diagnostic monitoring current Idig is observed in the fuel injection valve 109 of the third cylinder, the processing goes to Step S18. Similar determinations are subsequently executed in Steps S13*c* and S13*d* for the fuel injection valves 109 of the fourth cylinder and the second cylinder.

In this way, according to the present embodiment, the control section 102 exercises control in such a manner that the current detection section 112 detecting the current carried across the exciting coil of each fuel injection valve 109 detects the drive currents Idig based on the drive signals Tdig.

Figure 5:
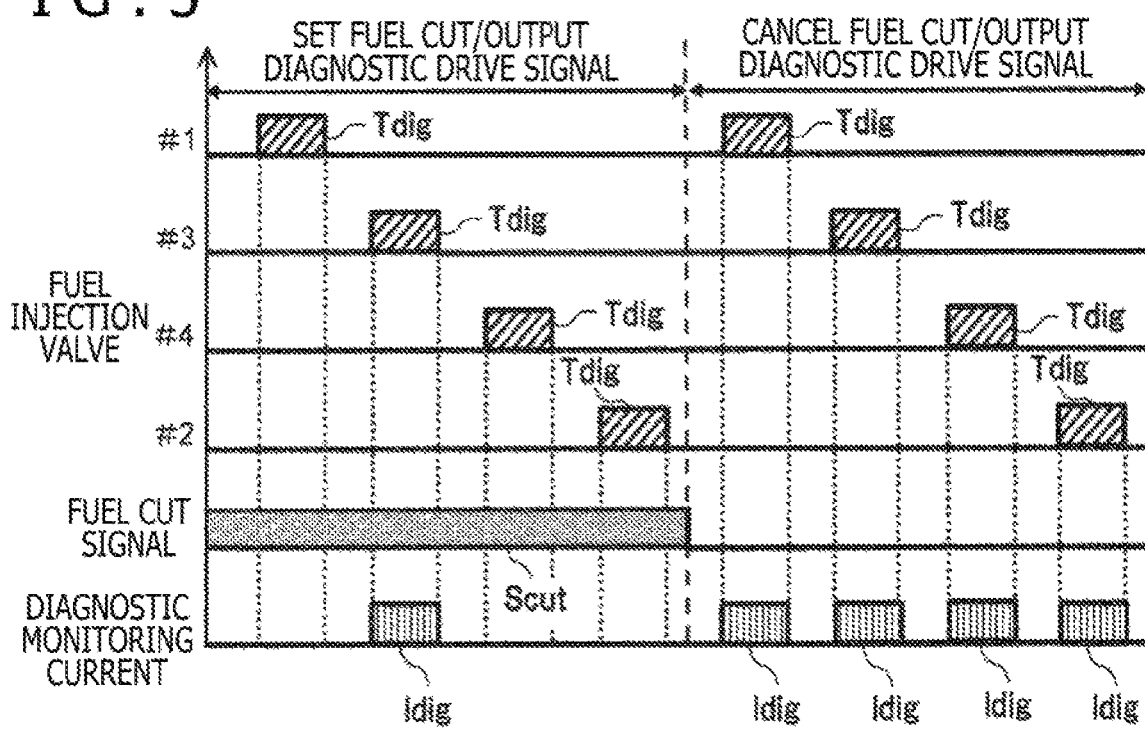
FIG. 5 is a timing chart in a case in which the fuel injection cut function does not normally work.

FIG. 5 depicts a case in which a diagnostic monitoring current Idig has been observed in the fuel injection cut setting state. In this case, while the fuel injection cut function is required to be executed to all fuel injection valves 109, a diagnostic monitoring current Idig is observed only in the fuel injection valve 109 of the second cylinder. Thus, it is determined that the fuel injection cut function does not normally work and the startup of internal combustion engine is prohibited in the following Step S18. It is noted that the diagnostic monitoring currents Idig are observed to correspond to the diagnostic drive signals Tdig since the fuel injection cut cancellation state is normal.

The fuel injection cut function is set in Step S11. Therefore, when the diagnostic monitoring current Idig is observed in at least one fuel injection valve in Steps S13, it is determined that the fuel injection cut function does not normally work and the processing goes to Step S18.

In this way, according to the present embodiment, the control section 102 prohibits the startup of the internal combustion engine when detecting carrying of the drive current Idig based on the drive signals Tdig to any of the fuel injection valves 109 in a case of transmitting the drive signals Tdig related to the plurality of fuel injection valves 109 to the fuel injection valve drive circuit 111 in the sequential order at predetermined intervals in a state in which the drive prohibition signal related to each fuel injection valve 109 is transmitted to the fuel injection valve drive circuit 111.

On the other hand, a case in which the diagnostic monitoring currents Idig are not observed in Step S13 possibly corresponds to any of a case in which the fuel injection cut function is set and normally works and the diagnostic monitoring signals have not been detected and a case in which the diagnostic monitoring signals Idig are not detected due to an abnormality in a control component that configures any of the fuel injection valves 109 or the ECU 101.

Figure 6:
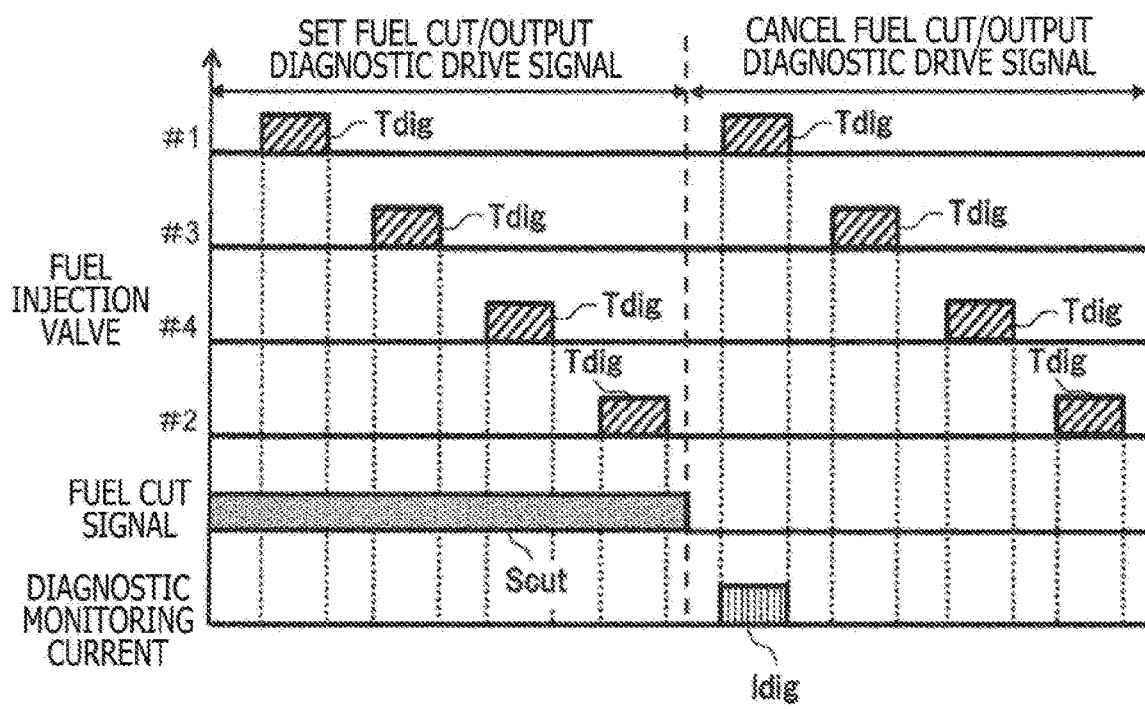
FIG. 6 is a timing chart in a case in which the fuel injection cut function normally works and an abnormality in one of fuel injection valves occurs.

FIG. 6 depicts a case in which the diagnostic monitoring signal Idig is observed only in the fuel injection valve 109 of the first cylinder in the fuel injection cut cancellation state due to the abnormality in the control component that configures any of the fuel injection valves 109 or the ECU 101. In this case, the diagnostic monitoring signal Idig corresponding to the diagnostic drive signal Tdig related to the fuel injection valve of the first cylinder is not observed in the fuel injection cut setting state since the fuel injection cut function is normal.

Figure 7:
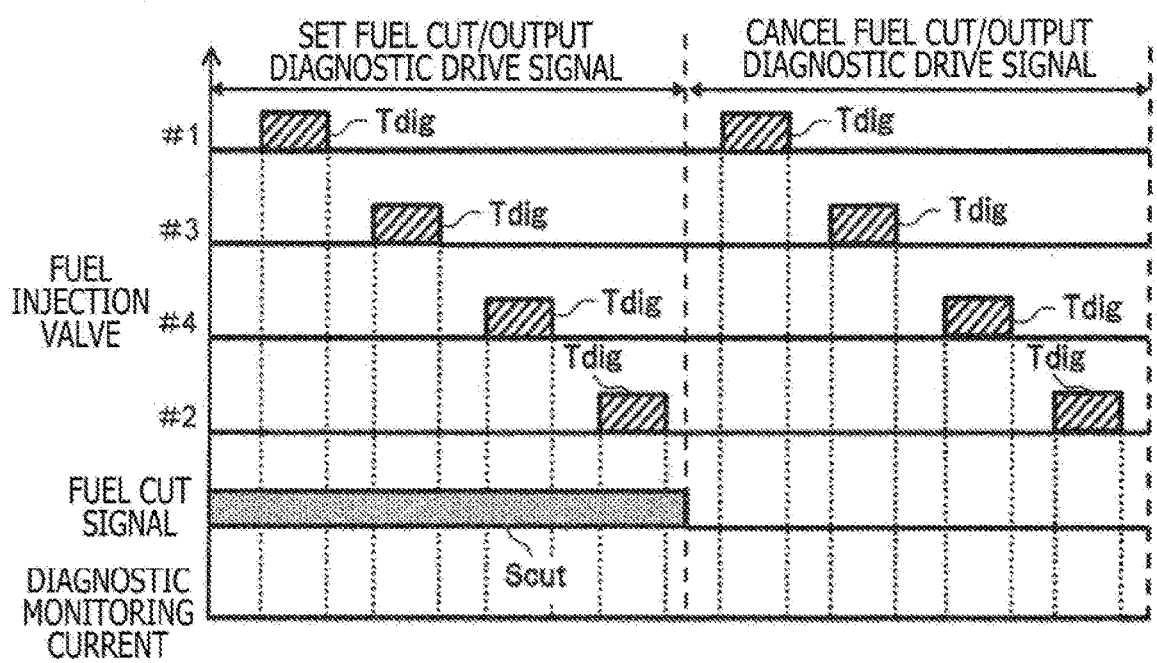
FIG. 7 is a timing chart in a case in which it is unclear whether the fuel injection cut function normally works.

On the other hand, FIG. 7 depicts a case in which the diagnostic monitoring signals Idig are not observed at all in any of the fuel injection valves 109 of the cylinders in the fuel injection cut cancellation state due to the abnormality in the control component that configures any of the fuel injection valves 109 or the ECU 101. In this case, the diagnostic drive signals Idig are not observed in the fuel injection cut setting state whether the fuel injection cut function is normal or not.

Therefore, as depicted in FIGS. 6 and 7, it is impossible to discriminate the case in which the fuel injection cut function is set and normally works and the diagnostic monitoring signals Idig are not been detected from the case in which the diagnostic monitoring signals Idig are not detected due to the abnormality in the control component that configures any of the fuel injection valves or the ECU 101. To address the problem and to discriminate the cases, the processing goes to Step S14 and cancellation of the fuel injection cut function is executed in Step S14.

<<Step S14>> In control steps, that is, Step S14 and the following steps, the fuel injection cut function is cancelled and normality of the fuel injection cut function is further confirmed. In Step S14, to cancel the fuel injection cut function, the control section 102 and the fuel injection cut function section 103 transmit the prohibition cancellation signal to the drive IC circuit 106 to cancel the fuel injection cut function, and the fuel injection cut setting state of the drive IC circuit 106 is cancelled. Upon cancellation of the fuel injection cut setting state, the processing goes to Step S15.

<<Step S15>> In Step S15, each diagnostic drive signal Tdig is set and output similarly to Step S12. Since Step S15 is similar to Step S12, description of Step S15 will be omitted. When each diagnostic drive signal Tdig is output, the processing goes to Step S16.

In this way, according to the present embodiment, the control section 102 sets the current value of the current carried to each fuel injection valve 109 to the magnitude at which the fuel injection valve is not allowed to be opened in the case of transmitting the drive prohibition cancellation signal related to each fuel injection valve 109 to the fuel injection valve drive circuit 111 after transmitting the drive prohibition signal and transmitting the drive signal Tdig related to the fuel injection valve 109 to the fuel injection valve drive circuit 111.

Moreover, according to the present embodiment, the control section 102 transmits the drive signal Tdig in which current-carrying time is set to be shorter than the disabled injection time for which each fuel injection valve 109 is not allowed to be opened, to the fuel injection valve drive circuit in both the fuel injection cut setting state and the fuel injection cut cancellation state.

<<Step S16>> In Step S16, it is determined whether a current has been supplied from the battery power supply 110 to each fuel injection valve 109 on the basis of the diagnostic drive signal Tdig set/output in Step S15. In this case, similarly to Step S13, the drive circuit 204 in the high-side fuel injection valve drive section 108a is turned on to select the battery power supply 110 and the drive circuit 205 in the low-side fuel injection valve drive section 108b is turned on in FIG. 2. Therefore, the diagnostic monitoring current Idig is carried across the shunt resistor 206 in the case in which the fuel injection cut function is cancelled.

It is noted that the determinations are executed to all fuel injection valves 109 and the determinations are according to the sequential order of actuating the cylinders as illustrated in Steps S16a to S16d. Since the fuel injection cut function is cancelled in Step S14, it is determined whether the diagnostic monitoring current Idig carried to at least one fuel injection valve 109 is observed in accordance with the sequential order of actuating the cylinders in Step S16.

For example, when the diagnostic monitoring current Idig is observed in the fuel injection valve 109 of the first cylinder in Step S16a, the processing goes to Step S17. On the other hand, when the diagnostic monitoring current Idig is not observed in the fuel injection valve 109 of the first cylinder, it is determined whether the diagnostic monitoring current Idig is observed in the fuel injection valve 109 of the third cylinder in Step S16b. When the diagnostic monitoring current Idig is observed in the fuel injection valve 109 of the third cylinder, the processing goes to Step S17. Similar determinations are subsequently executed in Steps S16c and S16d for the fuel injection valves 109 of the fourth cylinder and the second cylinder.

In other words, in the case in which the diagnostic monitoring currents Idig are not observed at all in the fuel injection cut setting state, it is deemed that the fuel injection cut function is normal or the abnormality occurs in the control component that configures any of the fuel injection valves 109 or the ECU 101. In the case in which the diagnostic monitoring current is observed in one fuel injection valve 109 in the fuel injection cut cancellation state, it is determined that the fuel injection cut function is normal. It is thereby possible to discriminate these cases.

In this way, in the case in which the diagnostic monitoring current Idig is observed in at least one fuel injection valve 109 in the fuel injection cut cancellation state, it is determined that the fuel injection cut function is normal. On the other hand, in the case in which the diagnostic monitoring current Idig is not observed in any of the fuel injection valves 109, then it is deemed that another abnormality other than the fuel injection cut function occurs, the processing goes to Step S19, and the startup of the internal combustion engine is prohibited in Step S19. In this way, it is determined whether to prohibit the startup in Steps S18 and S19 on the basis of different conditions.

Therefore, observing the diagnostic monitoring current Idig carried to each fuel injection valve 109 on the basis of the setting/cancellation of the fuel injection cut function makes it possible to ensure diagnosis of whether the fuel injection cut function works normally.

Figure 8:
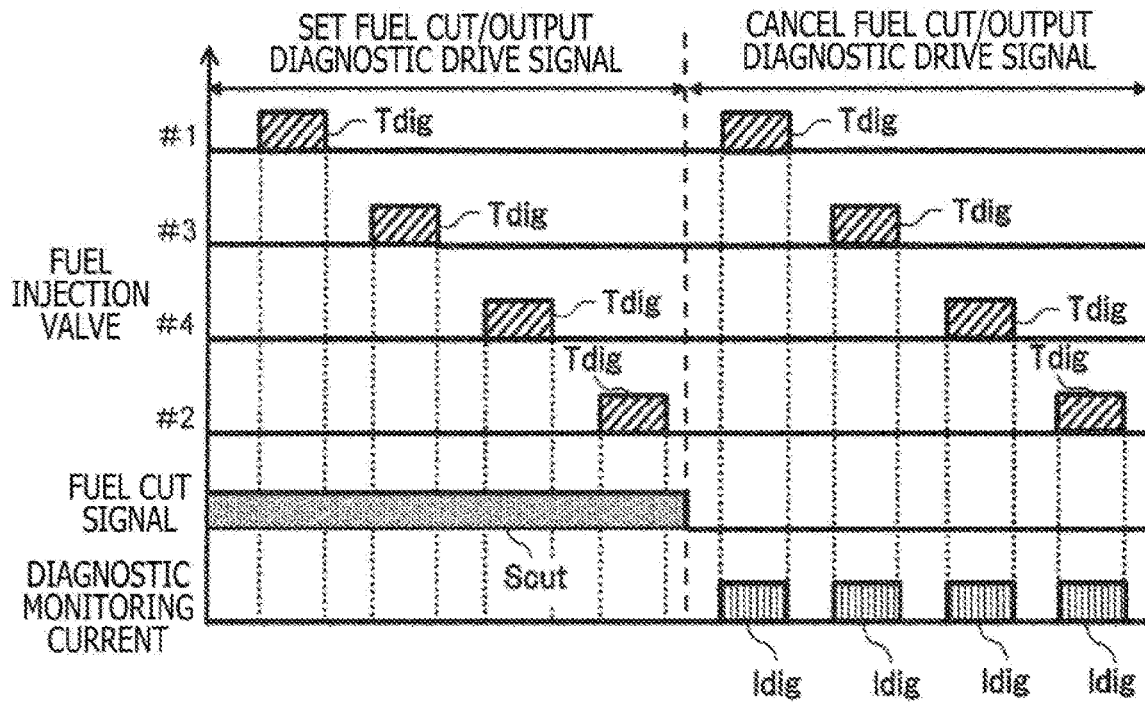
FIG. 8 is a timing chart in a case in which the fuel injection cut function normally works according to the first embodiment.

FIG. 8 depicts a case in which it is determined that the diagnostic monitoring currents Idig are not observed at all in the fuel injection valves in Step S13 and it is determined that the diagnostic monitoring currents Idig are observed in all fuel injection valves in Step S16, that is, a case in which the fuel injection cut function normally works. Since the fuel injection cut function is normal even if the diagnostic drive signal Tdig are output in the fuel injection cut setting state, the diagnostic monitoring currents Idig are not output at all in any of the fuel injection valves 109. Likewise, since the fuel injection cut function is cancelled upon output of the diagnostic drive signals Tdig in the fuel injection cut cancellation state, the diagnostic monitoring currents Idig are output in all fuel injection valves 109.

<<Step S17>> In Step S17, it is generally and finally determined that the fuel injection cut function is normal and the startup of the internal combustion engine is permitted since it is determined in Step S13 that the setting of the fuel injection cut function is normal and it is determined in Step S16 that the diagnostic monitoring current has been carried to at least one fuel injection valve 109. The internal combustion engine thereby starts up by activation of the starter motor.

In this way, according to the present embodiment, the control section 102 includes: a function that cancels the fuel injection cut setting state and causing the fuel injection valve drive circuit 111 to transition to the fuel injection cut cancellation state when detecting no carrying of the drive current Idig based on the drive signal Tdig in the fuel injection cut setting state; a function that transmits the drive signal Tdig to the fuel injection valve drive circuit 111 in the fuel injection cut cancellation state, and that detects whether the drive current Idig based on the drive signal Tdig has been carried to each of the fuel injection valves 109; and a function that permits the startup of the internal combustion engine when detecting carrying of the drive current Idig based on the drive signal Tdig to one of the fuel injection valves 109 in the fuel injection cut cancellation state.

<<Step S18>> In Step S18, the startup of the internal combustion engine is prohibited since it is determined in Step S13 that the setting of the fuel injection cut function is not normal. It is noted that it is possible to prohibit the startup of the internal combustion engine at an early stage when the diagnostic monitoring current Idig is confirmed in the present embodiment since the control steps, that is, Steps S11 to S13 of setting the fuel injection cut function are executed earlier.

In this way, according to the present invention, the control section 102 transmits the drive prohibition cancellation signal to the fuel injection valve drive circuit 111 after transmitting the drive prohibition signal to the fuel injection valve drive circuit 111 before the startup of the internal combustion engine.

As described so far, according to the present embodiment, the internal combustion engine fuel injection control system is configured from the internal combustion engine control device 101 including the fuel injection valve drive circuit 111 that applies a drive current to each of the fuel injection valves 109 and controlling the internal combustion engine. In addition, the internal combustion engine control device 101 is configured with the control section 102, 103, 112 that prohibits the startup of the internal combustion engine when detecting carrying of the drive current Idig based on the drive signal Tdig related to each of the fuel injection valves 109 to the fuel injection valve drive circuit 111 in a case of transmitting the drive prohibition signal related to the fuel injection valve 109 to the fuel injection valve drive circuit 111 before the startup of the internal combustion engine and transmitting the drive signal Tdig related to the fuel injection valve 109 to the fuel injection valve drive circuit 111.

More specifically, the fuel injection control unit 101 is configured with the control section 102 including: a function that transmits the drive signal Tdig related to each of the fuel injection valves 109 to the fuel injection valve drive circuit 111 in a state of setting the fuel injection valve drive circuit 111 into the fuel injection cut setting state before the startup of the internal combustion engine; a function that detects whether the drive current Idig based on the drive signal Tdig has been carried to the fuel injection valve 109 by an operation of the fuel injection valve drive circuit 111; and a function that prohibits the startup of the internal combustion engine when detecting carrying of the drive current Idig in the fuel injection cut setting state.

<<Step S19>> In Step S19, it is determined that the control component that configures any of the fuel injection valves 109 or the ECU 101 is abnormal and the startup of the internal combustion engine is prohibited since it is determined in Step S16 that the diagnostic monitoring current Idig is not observed in any of the fuel injection valves 109 and that the fuel injection cut function is not normal.

In this way, according to the present embodiment, the control section 102 includes: a function that cancels the fuel injection cut setting state and that causes the fuel injection valve drive circuit 111 to transition to the fuel injection cut cancellation state when detecting no carrying of the drive current Idig based on the drive signal Tdig in the fuel injection cut setting state; a function that transmits the drive signal Tdig to the fuel injection valve drive circuit 111 in the fuel injection cut cancellation state, and that detects whether the drive current Idig based on the drive signal Tdig has been carried to each of the fuel injection valves 109; a function that permits the startup of the internal combustion engine when detecting carrying of the drive current Idig based on the drive signal Tdig to one of the fuel injection valves 109 in the fuel injection cut cancellation state; and a function that prohibits the startup of the internal combustion engine when detecting that the drive current Idig based on the drive signal Tdig has not been carried to any of the fuel injection valves 109 in the fuel injection cut cancellation state.

In this way, by transmitting the diagnostic drive signal Tdig to the drive IC circuit 106 from the control section 102 and furthermore monitoring whether the diagnostic monitoring current Idig based on the diagnostic drive signal Tdig is carried to each of the fuel injection valves 109 in the state of transmitting the drive prohibition signal related to the fuel injection valve 109 to the drive IC circuit 106 to set the fuel injection cut function, or in the state of transmitting the prohibition cancellation signal related to the fuel injection valve 109 to the drive IC circuit 106 to cancel the fuel injection cut function, it is possible to ensure diagnosis of whether the fuel injection cut function normally works.

It is noted herein that, while the diagnostic drive signals are output to the fuel injection valves to execute the diagnosis at time intervals, the diagnosis of the fuel injection cut function can be executed simultaneously for the fuel injection valves in a case in which the simultaneous diagnosis can be executed by multiple CPUs or the like.

Figure 9:
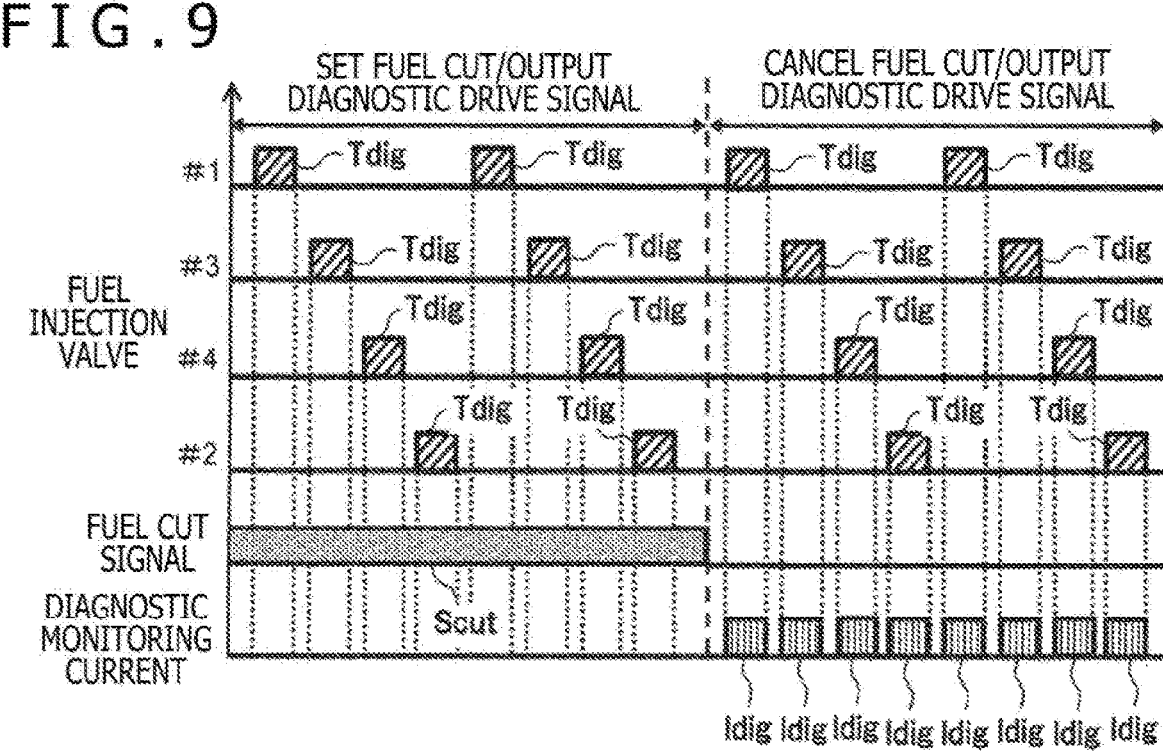
FIG. 9 is a control timing chart for determining normality of the fuel injection cut function according to a modification of the first embodiment.

A modification of the first embodiment will next be described with reference to FIGS. 9 and 10. As depicted in FIG. 9, according to the modification, a plurality of diagnostic drive signals Tdig are applied to one fuel injection valve 109 within time before activation of the starter motor for purposes of enhancing diagnostic accuracy. As illustrated in FIG. 3, at the time of setting the fuel injection cut function, Steps S11 to S13 may be executed for first diagnosis and the processing may return to Steps S11 to S13 to execute again Steps S11 to S13 for second diagnosis. Likewise, at the time of cancelling the fuel injection cut function, Steps S14 to S16 may be executed for the first diagnosis and the processing may return to Steps S14 to S16 to execute again Steps S14 to S16 for the second diagnosis.

According to the modification, similarly to the first embodiment, it is possible to determine the state in which the fuel injection cut function does not normally work at an early stage since the diagnosis at the time of setting the fuel injection cut function is executed earlier than the diagnosis at the time of cancelling the fuel injection cut function.

Figure 10:
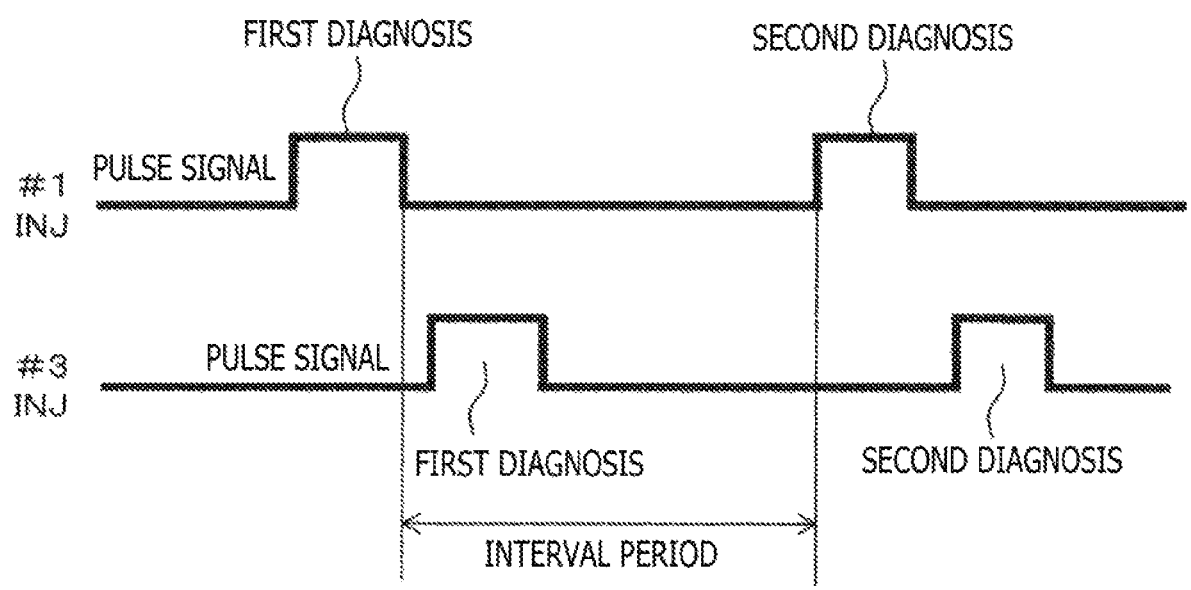
FIG. 10 is an explanatory diagram of an interval length between a plurality of diagnostic drive signals applied to the same fuel injection valve at times of diagnosis.

Furthermore, as depicted in FIG. 10, a predetermined interval length is set between timing of applying one diagnostic drive signal Tdig to one fuel injection valve and timing of applying another diagnostic drive signal Tdig thereto. If the interval length is short, the fuel injection valve 109 is possibly opened with the subsequent diagnostic drive signal Tdig for such reasons as instability of a needle at a valve closed position and residual magnetism in the needle.

Owing to this, for purposes of stabilizing the needle at the valve closed position and dissipating the magnetism in the needle, the diagnostic drive signals Tdig are applied to the fuel injection valves 109 in the sequential order of cylinders and the interval length is set in such a manner that the diagnostic drive signals Tdig to be applied to the other fuel injection valves 109 are present between at least continuous diagnostic drive signals Tdig to be applied to one fuel injection valve 109.

In an example depicted in FIG. 9, the interval length is set in such a manner that the diagnostic drive signals Tdig to be applied to the three remaining fuel injection valves 109 are present between the at least continuous diagnostic drive signals Tdig to be applied to the one fuel injection valve 109. Furthermore, according to the modification, the interval length can be used for diagnosis time for the other fuel injection valves 109; thus, the modification is advantageous in the diagnosis time.

In this way, according to the present embodiment, the control section 102 sets the interval length to the continuous drive signals Tdig in such a manner that the drive signals Tdig to be applied to the other fuel injection valves are present between the at least continuous drive signals Tdig to be applied to the one fuel injection valve 109.

Second Embodiment

Figure 11:
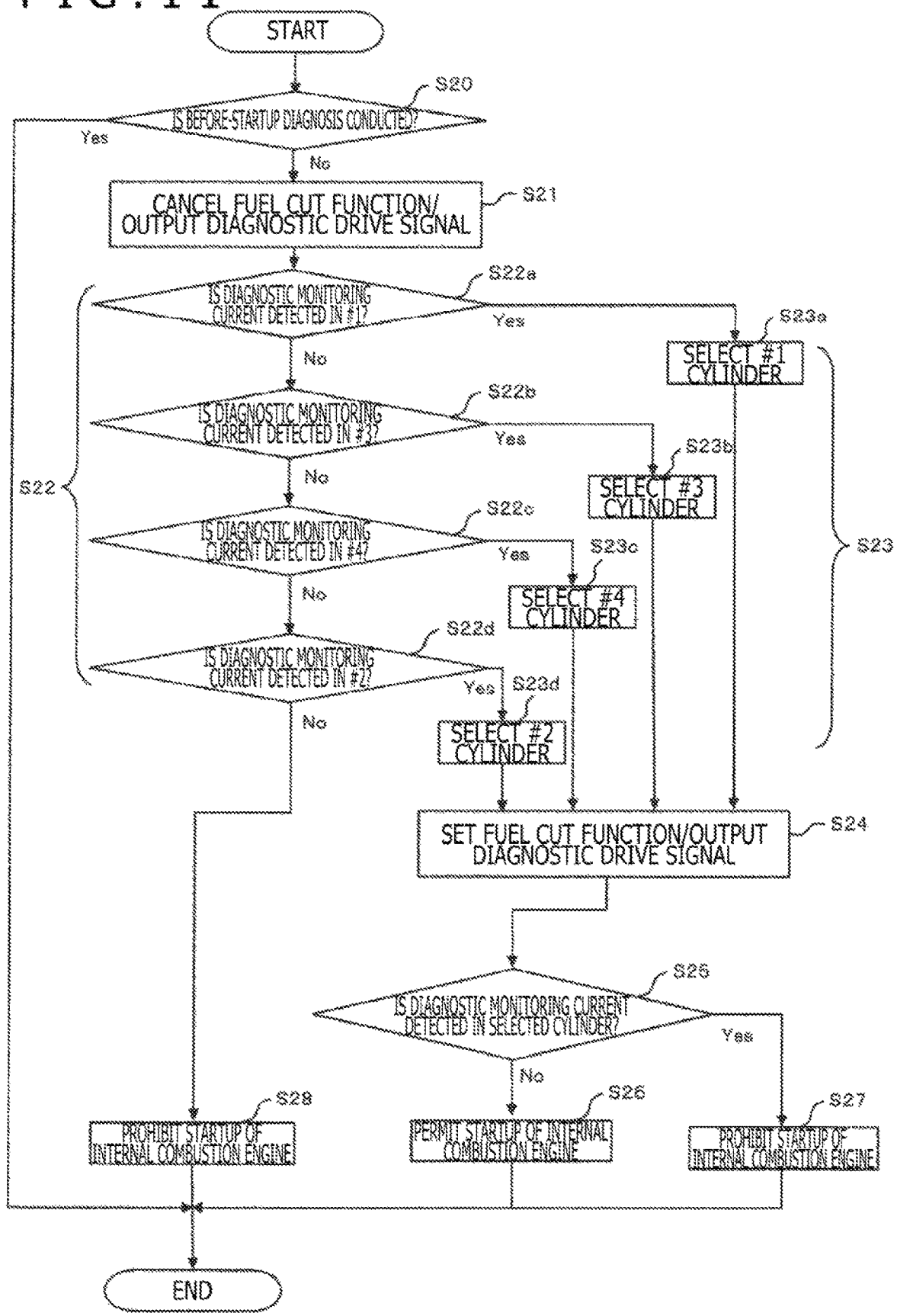
FIG. 11 is a control flowchart for determining the normality of the fuel injection cut function according to a second embodiment of the present invention.

While a second embodiment of the present invention is described with reference to FIGS. 11 and 12, the present embodiment differs from the first embodiment in that the cancellation of the fuel injection cut function is executed earlier than the setting of the fuel cut function. In the first embodiment, in which the fuel injection cut function is set earlier, an abnormality in the fuel injection cut function can be discriminated at an early stage in a case of occurrence of the abnormality; however, the first embodiment has a problem that the diagnosis time is long in a normal state.

To address the problem, according to the second embodiment, the cancellation of the fuel injection cut function is executed earlier than the setting of the fuel injection cut function, thereby making it possible to shorten the diagnosis time. While the second embodiment is described on the basis of a control flow depicted in FIG. 11, the same control steps as those in the control flow depicted in FIG. 3 will not be described.

Figure 3:
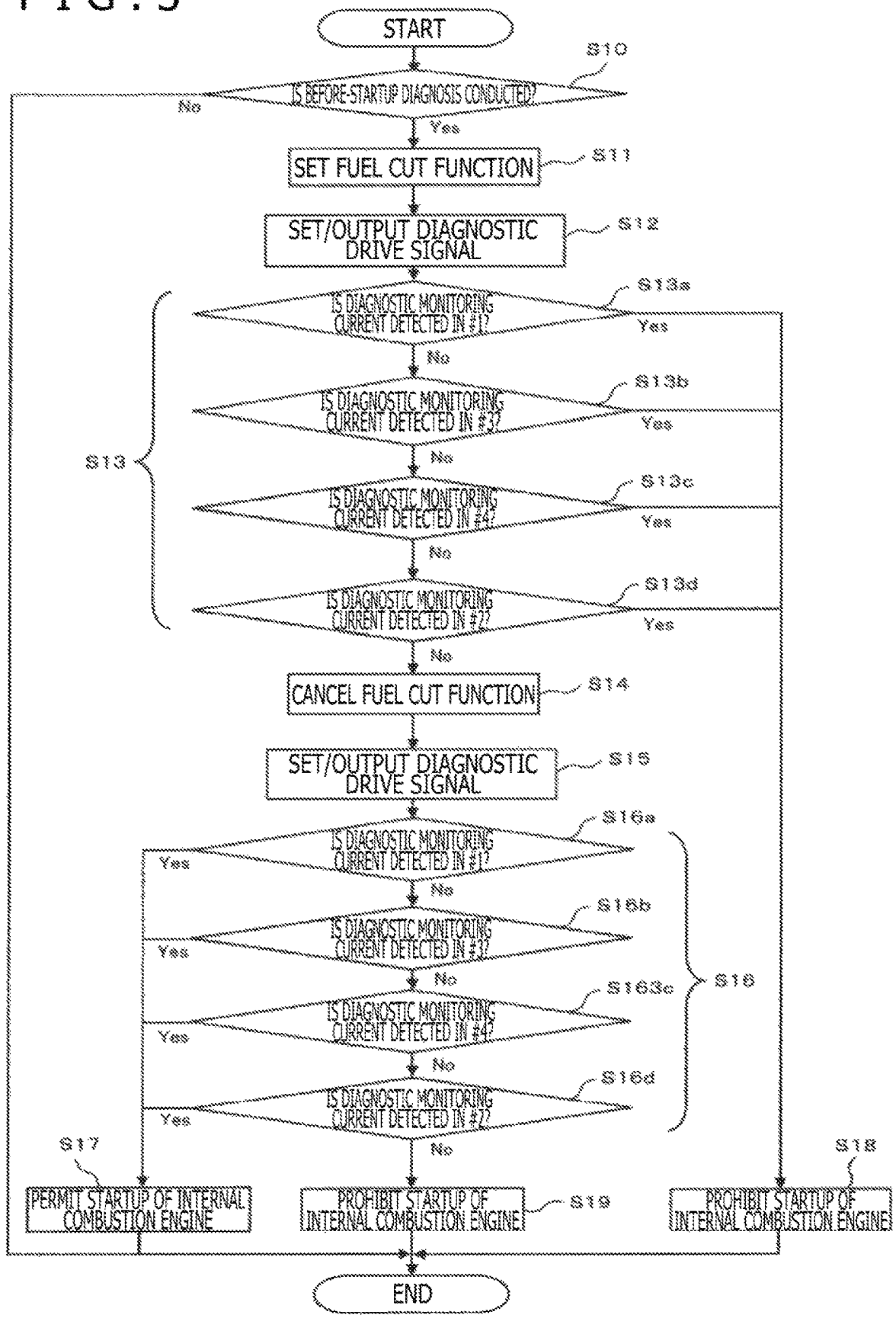
FIG. 3 is a control flowchart for determining normality of a fuel injection cut function according to a first embodiment of the present invention.

<<Step S20>> to <<Step S21>> Since Step S20 is the same as Step S10 of FIG. 3, description of Step S20 will be omitted. In addition, since Step S21 is the same as Steps S14 and S15 of FIG. 3, description of Step S21 will be omitted.

<<Step S22>> In Step S22, the diagnostic monitoring current Idig carried to each fuel injection valve 109 is observed in the fuel injection cut cancellation state. Since the presence of the diagnostic monitoring current Idig is monitored in the fuel injection cut cancellation state in this way, it is possible to diagnose earlier whether the control component of any of the fuel injection valves 109 or the ECU 101 normally works.

When the diagnostic monitoring current Idig is observed in the fuel injection valve 109 of the first cylinder in Step S22a, processing goes to Step S23a. On the other hand, when the diagnostic monitoring current Idig is not observed in the fuel injection valve 109 of the first cylinder, it is determined whether the diagnostic monitoring current Idig is observed in the fuel injection valve 109 of the third cylinder in Step S22b. When the diagnostic monitoring current Idig is observed in the fuel injection valve 109 of the third cylinder, the processing goes to Step S23b. Similar determinations are subsequently executed in Steps S22c and S22d for the fuel injection valves 109 of the fourth cylinder and the second cylinder. When the diagnostic monitoring current Idig is observed in any of the control steps, the processing goes to Step S23c or S23d.

Therefore, when the diagnostic monitoring current Idig is observed first in, for example, the fuel injection valve 109 of the first cylinder in Step S22a, the control components that configure the fuel injection valve 109 and the ECU 101 can normally operate and execution of the following control steps, that is, Steps S22b to S22d can be omitted. When the diagnostic monitoring current Idig is not observed in Step S22a, the processing goes to Step S22b and the same determination is executed in Step S22b. The following Steps S22c and S22d are similarly executed.

In this way, when the diagnostic monitoring current Idig is observed first, the subsequent control steps in Step S22 can be omitted and it is advantageously possible to shorten the diagnosis time. Furthermore, when the diagnostic monitoring current Idig cannot be observed in any of Steps S22a to S22d, it is determined that the control components that configure the fuel injection valves 109 and the ECU 101 cannot normally operate and the processing goes to Step S28 in which the startup of the internal combustion engine is prohibited.

<<Step S23>> In Step S23, the cylinder in which the diagnostic monitoring current Idig is observed first in any of Steps S23a to S23d is selected since the diagnostic monitoring current Idig can be observed in one of Steps S22a to S22d. Therefore, when the diagnostic monitoring current Idig is observed first in the fuel injection valve 109 of the first cylinder in Step S23a, execution of the following control steps, that is, Steps S23b to S23d can be omitted. Upon selection of one of the cylinders, the processing goes to Step S24.

<<Step S24>> Since Step S24 is the same as Steps S11 and S12 of FIG. 3, description of Step S24 will be omitted. It is noted, in this case, that the diagnostic drive signal Tdig is applied only to the fuel injection valve 109 of the selected cylinder and applying the diagnostic drive signals Tdig to the remaining fuel injection valves 109 can be omitted.

Upon setting of the fuel injection cut function and output of the diagnostic drive signal Tdig, the processing goes to Step S25.

<<Step S25>> In Step S25, it is determined whether the current has been supplied from the battery power supply 110 to the fuel injection valve 109 of the selected cylinder on the basis of the diagnostic drive signal Tdig set/output in Step S24. When the diagnostic monitoring current Idig is observed in the control step, it is determined that the fuel injection cut function does not normally work and the processing goes to Step S27, in which the startup of the internal combustion engine is prohibited. On the other hand, when the diagnostic monitoring current is not observed, it is determined that the fuel injection cut function normally works and the processing goes to Step S26, in which the startup of the internal combustion engine is permitted.

Figure 12:
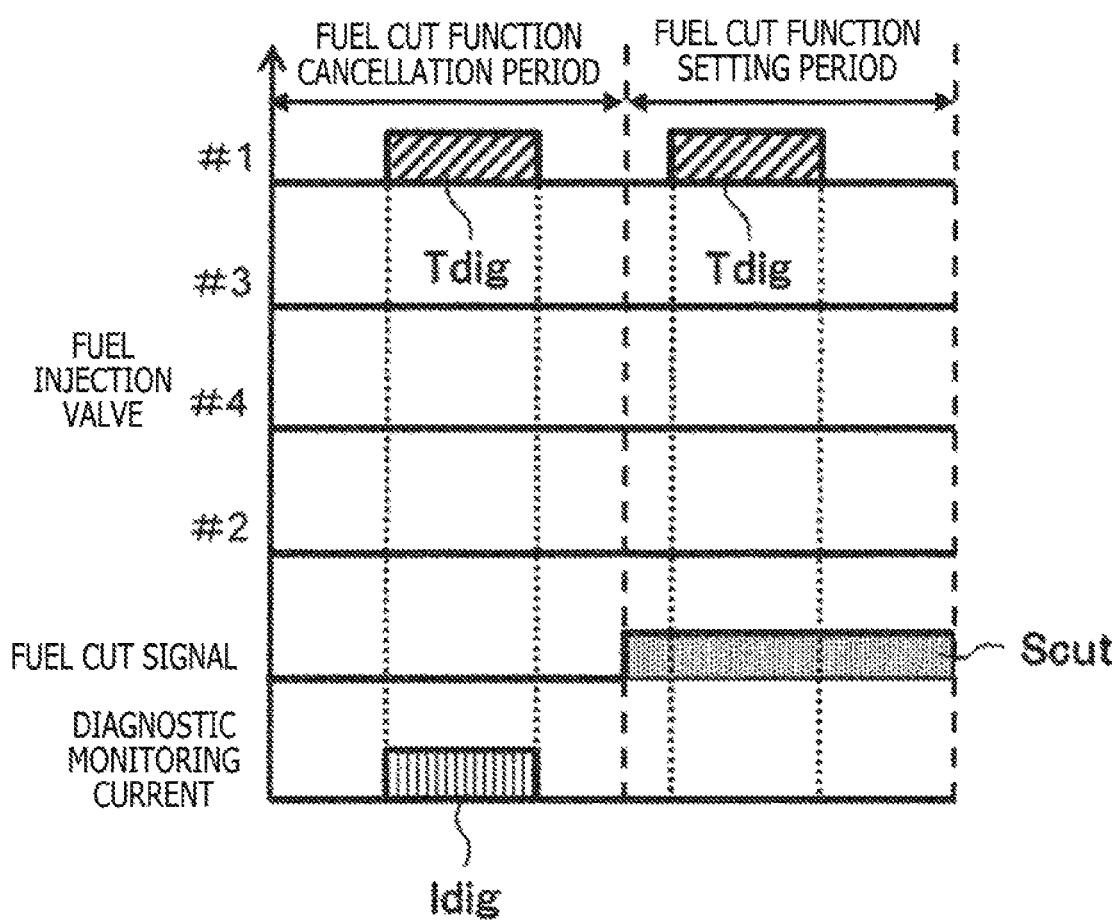
FIG. 12 is a timing chart in a case in which the fuel injection cut function normally works according to the second embodiment.

As depicted in FIG. 12, the diagnostic drive signal Tdig is output only to, for example, the fuel injection valve 109 of the first cylinder in both the fuel injection cut cancellation state and the fuel injection cut setting state, the diagnostic monitoring current Idig is observed to correspond to the output diagnostic drive signal Tdig in the fuel injection cut cancellation state, and the diagnostic monitoring current Idig corresponding to the output diagnostic drive signal Tdig is not observed in the fuel injection cut setting state. In this way, the diagnostic drive signal Tdig is applied only to the fuel injection valve 109 of the selected cylinder and not applied to the remaining fuel injection valves 109; thus, it is possible to diagnose the normality of the fuel injection cut function at an early stage.

<<Step S26>> In Step S26, it is finally determined that the fuel injection cut function is normal and the startup of the internal combustion engine is permitted since it is determined in Step S22 that the diagnostic monitoring current Idig has been carried to at least one fuel injection valve 109 and it is determined in Step S25 that the diagnostic monitoring current has not been carried to the selected fuel injection valve 109. The internal combustion engine thereby starts up by activation of the starter motor.

<<Step S27>> In Step S27, the startup of the internal combustion engine is prohibited since it is determined in Step S25 that the setting of the fuel injection cut function is not normal.

In this way, the internal combustion engine fuel injection control system is configured from the internal combustion engine control device 101 including the fuel injection valve drive circuit 111 that applies a drive current to each of fuel injection valves 109, and controlling the internal combustion engine. In addition, the control section 102 includes: a function that transmits the drive signal Tdig related to each of the fuel injection valves to the fuel injection valve drive circuit 111 in the state of setting the fuel injection valve drive circuit 111 into the fuel injection cut cancellation state before the startup of the internal combustion engine; a function that detects whether the drive current Idig based on the drive signal Tdig has been carried to each of the fuel injection valves 109 by an operation of the fuel injection valve drive circuit 111; a function that sets the fuel injection valve drive circuit 111 into the fuel injection cut setting state and that transmits the drive signal Tdig to the fuel injection valve drive circuit 111 when detecting carrying of the drive current Idig based on the drive signal Tdig to at least one fuel injection valve 109 in the fuel injection cut cancellation state; and a function that prohibits the startup of the internal combustion engine when detecting whether the drive current Idig based on the drive signal Tdig has been carried to the fuel injection valve 109 and detecting carrying of the drive current Idig based on the drive signal Tdig in the fuel injection cut setting state.

<<Step S28>> In Step S28, it is determined that the control component that configures any of the fuel injection valves 109 or the ECU 101 is abnormal and the startup of the internal combustion engine is prohibited since it is determined in Step S22 that the diagnostic monitoring current Idig is not observed in any of the fuel injection valves 109 and that the fuel injection cut function is not normal.

It is noted in the present embodiment that it is possible to shorten the diagnosis time since the normality of the fuel injection cut function is diagnosed for the cylinder in which the diagnostic monitoring current Idig is detected first in the fuel injection cut cancellation state.

Third Embodiment

While a third embodiment of the present invention is described with reference to FIG. 13, the present embodiment differs from the first embodiment in that it is diagnosed whether the fuel injection cut function normally works at a time of executing idling stop in the middle of driving the internal combustion engine.

<<Step S30>> In Step S30, ordinary self-diagnosis is executed to control components that configure each fuel injection valve 109 and the ECU 101 during driving of the internal combustion engine. Upon determining that the self-diagnosis is over, processing goes to Step S31.

<<Step S31>> In Step S31, a result of the self-diagnosis is confirmed for identifying whether a failure is present in any of the fuel injection valves 109 during driving of the internal combustion engine. When it is determined in Step S31a that a failure to the effect that the fuel injection valve 109 of the first cylinder does not operate is not present, the processing goes to Step S32a. On the other hand, when it is determined in Step S31a that a failure to the effect that the fuel injection valve 109 of the first cylinder does not operate is present, it is determined in Step S31b whether a failure to the effect that the fuel injection valve 109 of the third cylinder does not operate is present. When it is determined in Step S31b that a failure is not present, the processing goes to Step S32b. Similar determinations are subsequently executed in Steps S31c and S31d for the fuel injection valves 109 of the fourth cylinder and the second cylinder. When it is determined in any of the control steps that a failure is not present, the processing goes to Step S32c or S32d.

Therefore, when it is determined first that a failure is not present, for example, in the fuel injection valve 109 of the first cylinder in Step S31a, the control components that configure the fuel injection valve 109 and the ECU 101 can normally operate and execution of the following control steps, that is, Steps S22b to S22d can be omitted. When it is determined in Step S31a that a failure is present, the processing goes to Step S31b and the same determination is executed in Step S31b. The following Steps S31c and S31d are similarly executed.

In this way, when it is determined first that a failure is not present, the subsequent control steps in Step S31 can be omitted and it is advantageously possible to shorten the diagnosis time. Furthermore, when it is determined in all Steps S31a to S31d that a failure is present, it is determined that the control components that configure the fuel injection valves 109 and the ECU 101 cannot normally operate and the processing goes to Step S38 in which the startup of the internal combustion engine is prohibited.

<<Step S32>> In Step S32, the cylinder for which it is determined first that a failure is not present in any of Steps S32a to S32d is selected since it can be determined in any of Steps S31a to S31d in Step S31 that a failure is not present. Since the control steps in Steps S31 and S32 are equivalent to the fuel injection cut cancellation state according to the second embodiment, it is unnecessary to execute monitoring anew of the diagnostic monitoring current Idig at the time of cancelling the fuel injection cut function.

Therefore, when it is determined first in Step S32a that a failure is not present in the fuel injection valve 109 of the first cylinder, execution of the following control steps, that is, Steps S32b to S32d can be omitted. Upon selection of one of the cylinders, the processing goes to Step S33.

<<Step S33>> In Step S22, idling stop is executed when it is determined that a state is a state of executing the idling stop from information such as a pressing position of an accelerator pedal, a revolving speed of the internal combustion engine, and a pressing position of a brake pedal. At this time, the driving of the internal combustion engine is stopped, and the internal combustion engine does not rotate. Upon execution of the idling stop, the processing goes to Step S34.

<<Step S34>> Since Step S34 is the same as Steps SS11 and S12 of FIG. 3, description of Step S34 will be omitted. It is noted, in this case, that the diagnostic drive signal is applied only to the fuel injection valve 109 of the selected cylinder and applying the diagnostic drive signals Tdig to the remaining fuel injection valves 109 can be omitted since the revolution of the internal combustion engine is stopped. Upon setting of the fuel injection cut function and output of the diagnostic drive signal, the processing goes to Step S35.

<<Step S35>> In Step S35, it is determined whether the diagnostic drive current based on the diagnostic drive signal Tdig set/output in Step S34 has been supplied to the fuel injection valve 109 of the selected cylinder. When the diagnostic monitoring current Idig is observed in the control step, it is determined that the fuel injection cut function does not normally work and the processing goes to Step S37, in which the startup of the internal combustion engine is prohibited. On the other hand, when the diagnostic monitoring current is not observed, it is determined that the fuel injection cut function normally works and the processing goes to Step S36, in which the startup of the internal combustion engine is permitted.

<<Step S36>> In Step 36, it is finally determined that the fuel injection cut function is normal and the startup of the internal combustion engine is permitted since it is determined in Step S35 that the diagnostic monitoring current has not been carried to the fuel injection valve 109 selected in Step S35. The internal combustion engine thereby starts up by activation of the starter motor.

<<Step S37>> In Step S37, the startup of the internal combustion engine is prohibited since it is determined in Step S35 that the setting of the fuel injection cut function is not normal.

<<Step S38>> In Step S38, it is determined that the control component that configures any of the fuel injection valves 109 or the ECU 101 is abnormal and the startup of the internal combustion engine is prohibited since it is determined in Step S22 that failures occur in all fuel injection valves 109.

According to the present embodiment, the diagnosis of whether the fuel injection cut function normally works is executed when the idling stop is executed. It is thereby possible to diagnose whether the fuel injection cut function normally works after the startup of the internal combustion engine. Furthermore, a combination of the self-diagnosis executed in ordinary operation and a result of the diagnosis of the fuel injection cut function makes it possible to omit the control step of cancelling the fuel injection cut function and to diagnose whether the fuel injection cut function normally works at an early stage.

It is noted herein that the ECU 101 uses the high voltage generation section 107 and carries the drive current to each of the fuel injection valves 109 in accordance with the current profile in the first, second, and third embodiments. Owing to this, it is specified in the current profile used at the time of diagnosis that a peak current has a current value reachable only by the battery voltage from the battery power supply 110. Since it is unnecessary to open each fuel injection valve 109 in the diagnosis of the fuel injection cut function, it is unnecessary to set the peak current to have a peak current value necessary to open the fuel injection valve 109 in the ordinary operation.

Furthermore, if the diagnosis is carried out before the time at which a DC/DC converter that configures the high voltage generation section 107 is completed with step-up during the startup of the internal combustion engine, a predetermined drive current waveform is not obtained, possibly resulting in wrong diagnosis. Considering the above respects, the peak current is set to the peak current value reachable by the battery voltage without using the voltage from the high voltage generation section 107. It is thereby possible to carry out the diagnosis even when the DC/DC converter does not operate before the startup of the internal combustion engine and the stepped-up voltage is not obtained. It is also possible to prevent the fuel injection valves 109 from malfunctioning due to the excessively high peak current value.

As described so far, the present invention is characterized by prohibiting the startup of the internal combustion engine when detecting carrying of the diagnostic monitoring current based on the diagnostic drive signal to the fuel injection valve in the case of transmitting the drive prohibition signal related to the fuel injection valve to the fuel injection valve drive circuit before the startup of the internal combustion engine and transmitting the diagnostic drive signal related to the fuel injection valve to the fuel injection valve drive circuit.

According to the present invention characterized as described above, by transmitting the diagnostic drive signal related to each of the fuel injection valves to the fuel injection valve drive circuit in the state of transmitting the drive prohibition signal related to the fuel injection valve to the fuel injection valve drive circuit to actuate the fuel injection cut function, and by monitoring whether the diagnostic monitoring current based on the diagnostic drive signal is carried to the fuel injection valve, it is possible to ensure diagnosis of whether the fuel injection cut function normally works.

The present invention is not limited to the embodiments described above but encompasses various modifications. For example, the above embodiments have been described in detail for facilitating understanding of the present invention, and the present invention is not always limited to the invention having all the configurations described above. Furthermore, the configuration of a certain embodiment can be partially replaced by the configuration of the other embodiment or the configuration of the other embodiment can be added to the configuration of the certain embodiment. Moreover, for one means in the configuration of each embodiment, additions, omissions, and substitutions of the other configurations can be made.

DESCRIPTION OF REFERENCE CHARACTERS

101: ECU
102: Control section
103: Fuel injection cut function section
106: Drive IC circuit
107: High voltage generation section
108a, 108b: Fuel injection valve drive section
109: Fuel injection valve
111: Fuel injection valve drive section
112: Fuel injection valve operation monitoring section

The invention claimed is:

1. An internal combustion engine control device including a fuel injection valve drive circuit that applies a drive current to each of fuel injection valves and controlling an internal combustion engine, the internal combustion engine control device comprising:
a control section that prohibits startup of the internal combustion engine when detecting carrying of the drive current based on a drive signal related to each of the fuel injection valves to the fuel injection valve in a case of transmitting a drive prohibition signal related to each of fuel injection valves to the fuel injection valve drive circuit before the startup of the internal combustion engine and transmitting the drive signal related to each of fuel injection valves to the fuel injection valve drive circuit, wherein
a current value of the drive current applied from the fuel injection valve drive circuit to each of the fuel injection valves on the basis of the drive signal is set to a magnitude at which the fuel injection valve is not allowed to be opened.

2. The internal combustion engine control device according to claim 1, wherein
the control section transmits a drive prohibition cancellation signal related to each of the fuel injection valves to the fuel injection valve drive circuit after transmitting the drive prohibition signal, and
the current value of the drive current carried to each of fuel injection valves is set to the magnitude at which each of fuel injection valves is not allowed to be opened in a case in which the control section transmits the drive signal related to the fuel injection valve to the fuel injection valve drive circuit.

3. The internal combustion engine control device according to claim 1, wherein
the control section transmits the drive signal in which current-carrying time is set to be shorter than disabled injection time for which each of fuel injection valves is not allowed to be opened, to the fuel injection valve drive circuit.

4. The internal combustion engine control device according to claim 1, wherein
the control section prohibits the startup of the internal combustion engine when detecting carrying of the drive current based on the drive signal to any of the plurality of fuel injection valves in a case in which the control section transmits a plurality of the drive signals related to the plurality of fuel injection valves to the fuel injection valve drive circuit in a sequential order at predetermined intervals in a state in which the control section transmits the drive prohibition signal related to each of the fuel injection valves to the fuel injection valve drive circuit.

5. The internal combustion engine control device according to claim 1, wherein
the control section detects the drive current based on the drive signal from a current detection section that detects a current carried through an exciting coil of each of the fuel injection valves.

6. The internal combustion engine control device according to claim 2, wherein
the control section transmits the drive prohibition cancellation signal to the fuel injection valve drive circuit after transmitting the drive prohibition signal to the fuel injection valve drive circuit before the startup of the internal combustion engine.

7. The internal combustion engine control device according to claim 2, wherein
a power supply of each of the fuel injection valves is switchable by the fuel injection valve drive circuit over between a battery power supply and a high voltage power supply that generates a high voltage by stepping up a voltage from the batter power supply, and
the control section supplies the drive current to be carried to each of the fuel injection valves from the fuel injection valve drive circuit, from the battery power supply without via the high voltage power supply in a case in which the control section transmits the drive prohibition cancellation signal related to each of fuel injection valves to the fuel injection valve drive circuit before the startup of the internal combustion engine and in which the control section transmits the drive signal related to each of fuel injection valves to the fuel injection valve drive circuit.

8. An internal combustion engine control device including a fuel injection valve drive circuit that drives fuel injection valves and controlling an internal combustion engine, the internal combustion engine control device comprising:
a control section including
a function that transmits a drive signal related to each of the fuel injection valves to the fuel injection valve drive circuit in a state in which the fuel injection valve drive circuit is set into a fuel injection cut setting state before startup of the internal combustion engine,
a function that detects whether a drive current based on the drive signal has been carried to each of fuel injection valves by an operation of the fuel injection valve drive circuit, and
a function that prohibits the startup of the internal combustion engine when detecting carrying of the drive current based on the drive signal to each of fuel injection valves in the fuel injection cut setting state, wherein
the control section includes
a function that cancels the fuel injection cut setting state and that causes the fuel injection valve drive circuit to transition to a fuel injection cut cancellation state when the control section detects no carrying of the drive current based on the drive signal in the fuel injection cut setting state,
a function that transmits the drive signal to the fuel injection valve drive circuit in the fuel injection cut cancellation state, and that detects whether or not the drive current based on the drive signal has been carried to each of the fuel injection valves, and
a function that permits the startup of the internal combustion engine when the control section detects carrying of the drive current based on the drive signal to one of the fuel injection valves in the fuel injection cut cancellation state.

9. The internal combustion engine control device according to claim 8, wherein
the control section includes
a function that cancels the fuel injection cut setting state and that causes the fuel injection valve drive circuit to transition to a fuel injection cut cancellation state when the control section detects no carrying of the drive current based on the drive signal in the fuel injection cut setting state,
a function that transmits the drive signal to the fuel injection valve drive circuit in the fuel injection cut cancellation state, and that detects whether or not the drive current based on the drive signal has been carried to each of the fuel injection valves,
a function that permits the startup of the internal combustion engine when the control section detects carrying of the drive current based on the drive signal to one of the fuel injection valves in the fuel injection cut cancellation state, and
a function that prohibits the startup of the internal combustion engine when the control section detects no carrying of the drive current based on the drive signal to any of the fuel injection valves in the fuel injection cut cancellation state.

10. An internal combustion engine control device including a fuel injection valve drive circuit that drives fuel injection valves and controlling an internal combustion engine, the internal combustion engine control device comprising:
a control section including
a function that transmits a drive signal related to each of the fuel injection valves to the fuel injection valve drive circuit in a state in which the fuel injection valve drive circuit is set into a fuel injection cut cancellation state before startup of the internal combustion engine,
a function that detects whether or not a drive current based on the drive signal has been carried to each of the fuel injection valves by an operation of the fuel injection valve drive circuit,
a function that sets the fuel injection valve drive circuit into a fuel injection cut setting state and that transmits the drive signal to the fuel injection valve drive circuit when the control section detects carrying of the drive current based on the drive signal to at least one of the fuel injection valves in the fuel injection cut cancellation state, and
a function that prohibits the startup of the internal combustion engine when the control section detects whether or not the drive current based on the drive signal has been carried to each of the fuel injection valves and detects carrying of the drive current based on the drive signal in the fuel injection cut setting state.

11. The internal combustion engine control device according to claim 8, wherein
the control section transmits the drive signal in which current-carrying time is set to be shorter than disabled injection time for which each of the fuel injection valves is not allowed to be opened, to the fuel injection valve drive circuit.

12. The internal combustion engine control device according to claim 8, wherein
the control section transmits,
in the fuel injection cut setting state and in the fuel injection cut cancellation state,
the drive signal in which current-carrying time of the drive signal is set to be shorter than disabled injection time for which each of the fuel injection valves is not allowed to be opened, to the fuel injection valve drive circuit.

13. The internal combustion engine control device according to claim 12, wherein
the control section sets an interval length to at least continuous drive signals to be applied to one of the fuel injection valves in such a manner that the drive signal to be applied to the other fuel injection valve is present between the at least continuous drive signals.

* * * * *